June 18, 1940. W. ROHN 2,205,049
BEARING
Filed June 28, 1938 2 Sheets-Sheet 2
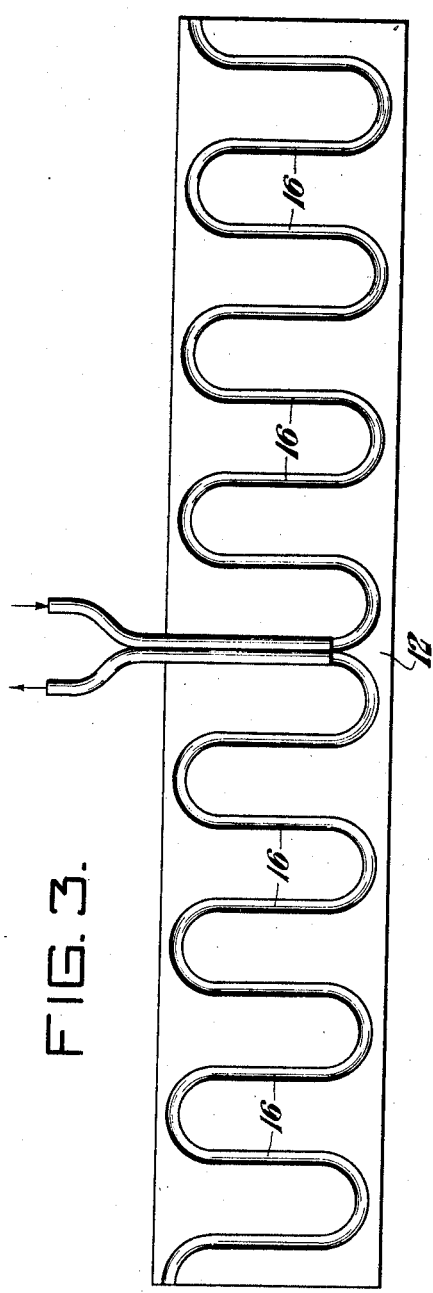
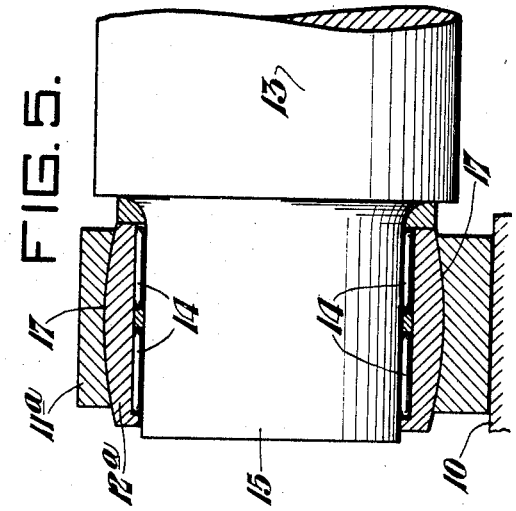
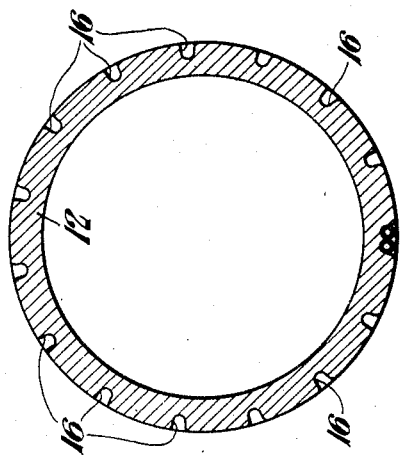
Inventor:
Wilhelm Rohn,
by: John E Jackson
his Attorney.

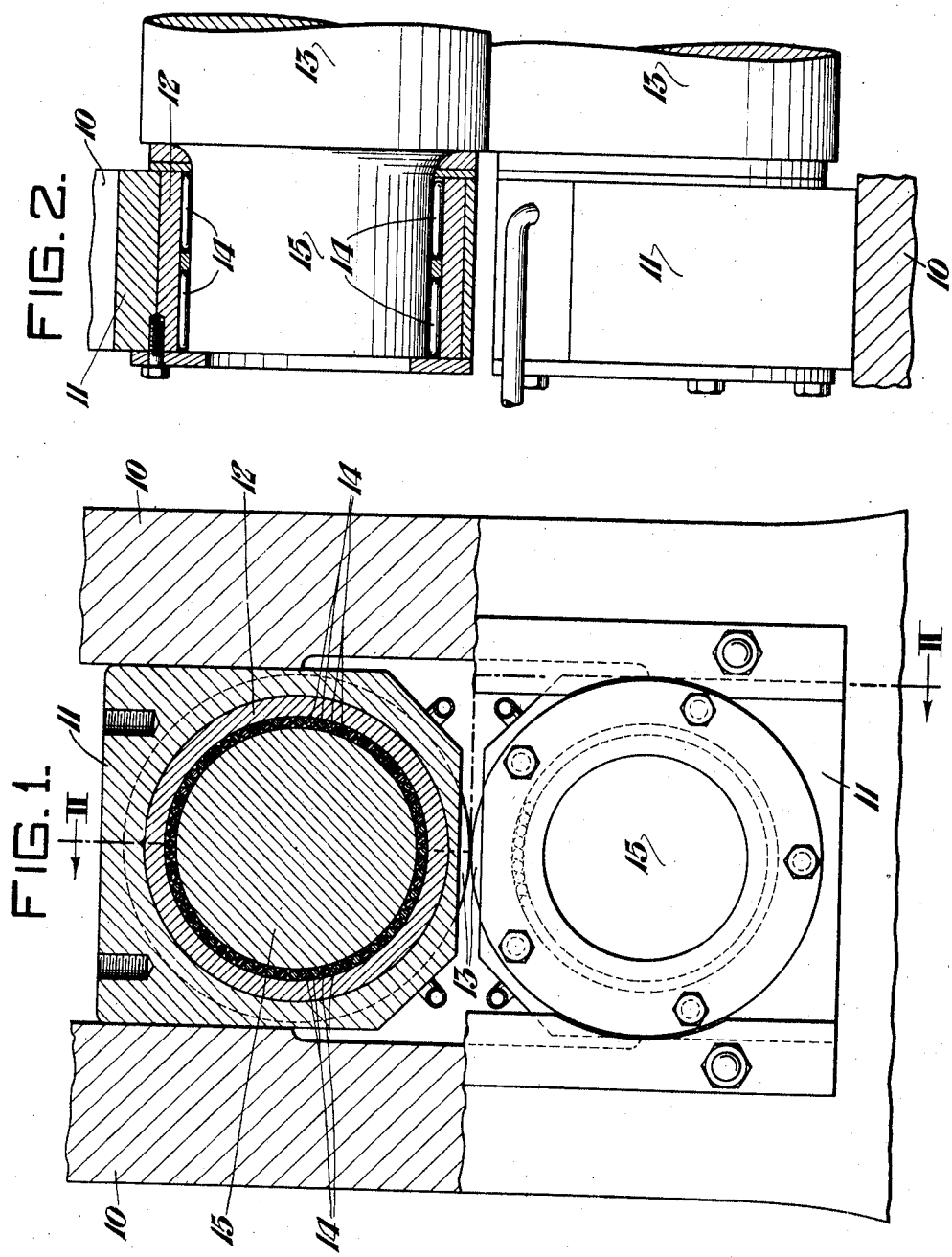

Patented June 18, 1940

2,205,049

UNITED STATES PATENT OFFICE 2,205,049

BEARING

Wilhelm Rohn, Hanau, Germany

Application June 28, 1938, Serial No. 216,325
In Germany May 21, 1937

16 Claims. (Cl. 80—55)

This invention relates generally to bearings for supporting shafts and axles of various types, and is particularly well suited for coaction with the roll necks of the working rolls of rolling mills.

One object of my invention is to provide means for replacing bronze bearings and avoid the disadvantages associated with bearings of molded synthetic resin and conventional types of roller bearings.

Another object of my invention is to provide an improved type of bearing peculiarly well suited for use in environments where enormous pressures are encountered and which will overcome the deficiencies which are inherent in the bearings heretofore generally used.

A further object is to provide a construction peculiarly well suited for use in rolling mills whereby roll necks of diameters larger than those customarily used can be employed without the necessity of using correspondingly large window openings in the mill housing, so that my novel and improved bearings can be substituted for conventional bearings heretofore used in rolling mills and yet permit the working rolls of the mill to make greater reductions per pass without dangerously deflecting the roll necks, this advantage being securable under my invention because the increased diameter of the roll necks prevents undue deflection thereof and the smaller bearing rollers employed are so proportioned that they have greater elasticity and are therefore not so easily fatigued.

A further object of the invention is to provide a construction wherein there is predetermined relationship between the diameter of slender bearing rollers and the length thereof.

Another object of the invention is to provide an arrangement in which slender rollers are interposed between a steel race ring and a roll neck, said ring having an annular wall thickness of approximately not more than one-tenth of the diameter of the roll, such ring being either of unhardened steel or a high-strength alloy steel.

A further object of the invention is to provide a bearing structure having the cooperating instrumentalities for performing the functions set forth and having the novel detail characteristics herein described, illustrated and claimed.

Heretofore white metal or bronze bearings have been used very widely, and there has been a recent trend in the art to substitute other materials for bronze. There has been progress in the use of bearings employing molded synthetic resin bearing elements. While such resinous bearings have been advantageous in supporting light loads, it is very doubtful that they would have sufficient strength to withstand the enormous pressures encountered in heavy duty machinery. A disadvantage of bearings made of molded synthetic resin and the like is that they require the application of a cooling medium, such as a heavy stream of running water, and their performance is quite inferior without copious water lubrication.

In rolling mills in which exceptionally heavy pressures are employed, there is not sufficient room in the mill housings for roller bearings of conventional size utilizing bearing rollers whose diameters are frequently not less than one-third of their length. The use of such large diameter bearing rollers is regarded impractical because the bending of the working rolls caused by the heavy loading tends to cause fatigue fractures or spalling of the bearing rollers, even when oscillating bearings, barrel-shaped rolls or movable spherical pillow blocks are used.

Needle bearings per se are well known, but formerly it has been assumed that they could operate satisfactorily only when both working faces thereof coacted with hardened steel parts, such as a hardened steel sleeve mounted on the roll neck and a hardened steel race ring surrounding the same. Under my invention the race ring need not be hardened, and it is of such minimum thickness that it can be readily inserted in the location in a mill formerly occupied by conventional bronze bearings, and can be conveniently mounted in the bearing block carried by the mill housing. Moreover, the slender bearing rollers, according to my invention, can coact directly with the surface of the roll neck, which need not be prehardened and need not be provided with the hardened sleeve heretofore thought necessary. In the bearings embodying my invention, both the roll neck and the race ring operate satisfactorily if they have a Scleroscope hardness of from approximately 45 to 65.

An embodiment of the invention is illustrated in the accompanying drawings, wherein Figure 1 is a view, partly in elevation and partly in section, showing my improved bearing used for supporting the working rolls of a rolling mill;

Figure 2 is a section view on a staggered line II—II of Figure 1;

Figure 3 is a development of a bearing race ring provided with means for circulating a cooling medium in contact with the same;

Figure 4 is a detached detail of a cooled bearing race; and

Figure 5 is a view similar to Figure 2 illustrating a detail modification.

Referring in particular to the drawings, the numeral 10 represents a conventional form of rolling mill housing, 11 a bearing supporting block mounted in the window openings thereof and carrying a race ring 12. This ring will normally have a wall thickness of about one-twentieth to one-tenth of the diameter of the working roll 13. When the thickness of the race ring is greater than one-tenth of the roll diameter, it may be planed on four sides so as to permit the ring to be introduced through the windows of the housing and assembled in a suitable recess formed in the bearing block 11. The bearing blocks may be formed either with special steel inserts or they may be fashioned of discarded bearing blocks. Such old bearing blocks, after removal of the conventional bronze bearings, must have an opening formed therein of sufficient size and shape to accommodate the race ring 12. It will be appreciated by those skilled in the art that in most cases this arrangement provides means whereby the diameter of the roll necks can be increased under the present invention, whereas in using conventional roller bearings of the prior art, the substitution thereof for conventional bronze bearings would be accompanied by a reduction in the diameter of roll necks with an accompanying loss in the permissible load which could be imposed upon the working rolls.

In practical operation, working rolls which were mounted in bearings embodying the present invention showed that fewer passes were required to reduce the metal to a desired gauge and less power was consumed, as compared with the same mills using conventional bronze bearings.

In the bearings of my invention, the slender rollers 14 are of critical proportions as expressed, for example, by the ratio between their diameter and length, and also as expressed by comparing the diameter of the working rolls with the diameter of the slender bearing rollers, as more particularly pointed out in detail hereinafter.

Slender rollers 14 are interposed between the race ring 12 and the roll neck 15 and, as above mentioned, I have found that, by maintaining the proportion of parts to which reference is hereinafter made, neither the roll necks nor the race ring need be prehardened. The slender rollers 14, as shown, contact directly or make a face-to-face contact with one another; thus they substantially fill the annular space between the outer surface of the roll neck and the inner cylindrical surface of the race ring. Because of the slenderness of the bearing rollers, in the event of their axes assuming positions other than parallelism with the axes of rotation of the working rolls, they can flex sufficiently to properly conform to the opposed faces of the roll neck and race ring without inducing destructive fatigue stresses in either the bearing rollers themselves, in the working rolls or the roll necks.

It is a particular feature of this invention to employ slender bearing rollers of such proportions that they have a ratio between their diameter and length within the range of 1 to 10 as a high limit and 1 to 50 as a low limit. Otherwise expressed, the roller diameter should not exceed one-tenth of the length, and should not be less than one-fiftieth of the length. In using such slender rollers, there is no development of edge pressure which might lead to spalling, because any slight bending of the working rolls and roll necks is accompanied by a similar bending of the slender rollers. In other words, because of their slenderness, the bearing rollers may be said to have sufficient elasticity to follow the bending of the working rolls without imposing fatigue loads on either the slender rollers or the working rolls, and because of the use of such slender bearing rollers the diameter of the working roll necks is increased; thus the likelihood of the working rolls or the roll necks reaching fatigue loads is minimized; thus their length of useful life is increased.

The "edge pressure" referred to above is intended to refer to the thrust exerted by the end edges of needle rolls heretofore used when the longitudinal axis thereof assumed positions out of parallelism with the axes of the trunnions or roll necks which they support. With the slender rolls of the present invention, the same follow any small amount of bending or deflection of the trunnions or roll neck and they thus stay in parallelism and do not set up the objectionable end pressure.

It is also deemed advantageous that the diameter of the bearing rollers fall within the range between one-twentieth to one-eightieth of the diameter of the working rolls.

In some instances, the outer face of the race ring will conform with the surface of a sphere, as indicated at 17 in Figure 5, so as to permit relative motion between the modified form of race ring 12$^a$ and its bearing block 11$^a$ so that the bearing as a whole can find its own seat and thus compensate for any slight bending or deflection of the working rolls.

While in many instances special cooling of the bearing is unnecessary, in other cases the cooling of the interior of the roll neck is sufficient.

In using the slender rollers of the present invention, the cooling of the bearing can be accomplished by the circulation of cooled lubricating oil between the slender rollers. Moreover, the use of unhardened race sleeves makes it possible to readily form channels 16 in the wall thereof, through which cooling water may be introduced, and because the race ring is unhardened, copper cooling pipes can be readily brazed to them. It is practically impossible to so braze such cooling pipes to hardened race rings.

In practice I have found that in a mill embodying my invention, high nickel steel could be rolled, without intermediate annealing, from the original thickness of 7 mm. to 1.5 mm. in eleven passes, while the same reduction required twenty passes in mills whose working rolls were supported on conventional bronze bearings. The mills in which these comparison tests were made were entirely identical in all particulars, with the exception of the bearings, and it was found that the current consumption in the mills having the bearings of my invention was from 40 to 90 amperes as compared with the current consumption of from 110 to 140 amperes in using the mill equipped with the conventional bronze bearings.

While the race rings used in the mill having bearings of my invention need not be hardened, it is entirely possible, if desired, to use in place of such unhardened rings, rings of steel having a high strength and characterized by a greater Scleroscope hardness than that hereinbefore mentioned.

It is deemed advantageous, in starting up mills embodying the present invention, to run the mills for a few hours or days at a somewhat lighter load than usual so that the inner bearing surfaces of the race rings and the surface of the roll necks will be highly polished by the slender rolls within the first few hours of operation, thus bringing them to the optimum condition.

While I have described, quite specifically, preferred embodiments of the invention, it is to be understood that detailed disclosure is to be interpreted in an illustrative sense, and the only limitations imposed are to be those required by the prior art or specifically recited in the appended claims.

I claim:

1. A bearing for supporting a rotating element comprising an unhardened metal race ring whose Scleroscopic hardness is approximately in the range of from 45 to 65 and which surrounds the element, and slender rollers interposed between the element and the race ring, said rollers having respective diameters which are not greater than one-tenth of their respective lengths.

2. A rolling mill having coacting working rolls, including roll necks journaled in bearings, wherein each bearing comprises a steel race ring coacting with slender rollers interposed between the inner surface of the ring and the outer surface of the roll neck, the respective diameters of said slender rollers being not greater than one-tenth of their respective lengths.

3. A rolling mill according to claim 2 wherein the diameter of the slender rollers lies in the range between one-tenth to one-fiftieth of the length thereof.

4. A rolling mill according to claim 2 in which the steel race ring has a thickness of not more than one-tenth of the diameter of the working roll.

5. A rolling mill according to claim 2 having a housing with a window opening within which is mounted a bearing block, the mill having a steel race ring whose thickness is greater than one-tenth of the working roll diameter and which is machined on opposite surfaces so as to permit introduction through the windows of the roll housing, said race ring being supported within said bearing block.

6. The bearing of claim 1 in which the race ring is made of unhardened steel which has a Scleroscope hardness ranging from approximately 40 to 60.

7. The rolling mill of claim 2 in which the race ring is made of unhardened steel which has a Scleroscope hardness ranging from approximately 40 to 60.

8. The bearing of claim 1 in which the race ring is made of high strength alloy steel.

9. The rolling mill of claim 2 in which the race ring is made of alloy steel of high strength.

10. A bearing according to claim 1 in which the slender rollers run directly on an unhardened rotating element.

11. A rolling mill according to claim 2 wherein the roll necks are unhardened and the slender rollers run directly thereon.

12. A rolling mill according to claim 2 wherein the outer surface of the race ring conforms substantially to that of a sphere so as to permit the race ring to partake of motion imparted thereto by deflection of the working rolls and roll necks.

13. A rolling mill according to claim 2 wherein means are provided for circulating precooled oil through the interstices between the slender rollers in the annular region between the exterior of the roll neck and the inner surface of the race ring.

14. A rolling mill according to claim 2 wherein the race ring is formed of unhardened steel provided with channels adapted to have a cooling medium circulated therethrough.

15. A rolling mill according to claim 2 wherein the race ring is formed of unhardened steel and has channels formed in the outer surface thereof, and respective inlet and outlet means communicating with said channels for circulating cooling medium through said channels.

16. In the operation of a rolling mill having bearings according to claim 2 in which the mill is operated at the beginning at a somewhat lighter load than normal so that the race and roll necks are highly polished.

WILHELM ROHN.